United States Patent
Herrmann

(10) Patent No.: US 6,659,571 B2
(45) Date of Patent: Dec. 9, 2003

(54) VEHICLE WITH AN ELECTRICAL TRACTION MOTOR AND AN ADDITIONAL USER OF ELECTRICAL ENERGY AND METHOD FOR OPERATION OF THE VEHICLE

(75) Inventor: Udo Herrmann, Johannesberg (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 10/078,304

(22) Filed: Feb. 19, 2002

(65) Prior Publication Data

US 2002/0158509 A1 Oct. 31, 2002

(30) Foreign Application Priority Data

Feb. 23, 2001 (DE) .......................................... 101 08 909

(51) Int. Cl.$^7$ ................................................. B60T 8/64
(52) U.S. Cl. ........................ 303/152; 303/151; 303/122
(58) Field of Search ................................. 303/151, 152, 303/122, 122.01, 122.04, 20; 180/65.1; 290/9

(56) References Cited

U.S. PATENT DOCUMENTS

| | | | | |
|---|---|---|---|---|
| 3,851,232 A | * | 11/1974 | Chirgwin | 318/150 |
| 4,126,791 A | * | 11/1978 | Raud | 290/11 |
| 4,787,021 A | * | 11/1988 | Hokari et al. | 363/37 |
| 4,962,969 A | * | 10/1990 | Davis | 303/3 |
| 5,291,960 A | * | 3/1994 | Brandenburg et al. | 180/65.2 |
| 5,345,761 A | * | 9/1994 | King et al. | 60/274 |
| 5,450,324 A | * | 9/1995 | Cikanek | 701/108 |
| 5,472,265 A | * | 12/1995 | Ohnuma | 303/3 |
| 5,561,380 A | * | 10/1996 | Sway-Tin et al. | 324/509 |
| 5,598,072 A | * | 1/1997 | Lambert | 318/376 |
| 5,632,534 A | * | 5/1997 | Knechtges | 303/152 |
| 5,698,905 A | * | 12/1997 | Ruthlein et al. | 290/32 |
| 5,788,597 A | * | 8/1998 | Boll et al. | 477/4 |
| 6,070,680 A | * | 6/2000 | Oyama | 180/65.2 |
| 6,209,672 B1 | * | 4/2001 | Severinsky | 180/65.2 |
| 6,425,365 B1 | * | 7/2002 | Peters et al. | 123/198 DB |
| 6,450,275 B1 | * | 9/2002 | Gabriel et al. | 180/65.4 |
| 6,459,166 B2 | * | 10/2002 | Yanase et al. | 290/40 C |

FOREIGN PATENT DOCUMENTS

| | | | |
|---|---|---|---|
| DE | 2427432 A1 | * | 12/1975 |
| DE | 3428118 A1 | * | 2/1986 |

\* cited by examiner

*Primary Examiner*—Matthew C. Graham
*Assistant Examiner*—Melody M. Burch
(74) *Attorney, Agent, or Firm*—Webb Ziesenheim Logsdon Orkin & Hanson, P.C.

(57) ABSTRACT

A vehicle has at least one electrical traction motor, at least one additional user of electrical energy, a vehicle control system and a source of electrical energy. The traction motor is effectively connected with the vehicle control system so that in the event of a failure of the source of electrical energy, the vehicle is automatically decelerated in regenerative operation and the user is supplied with electrical energy by the traction motor which is operating in the regenerative mode.

7 Claims, 1 Drawing Sheet

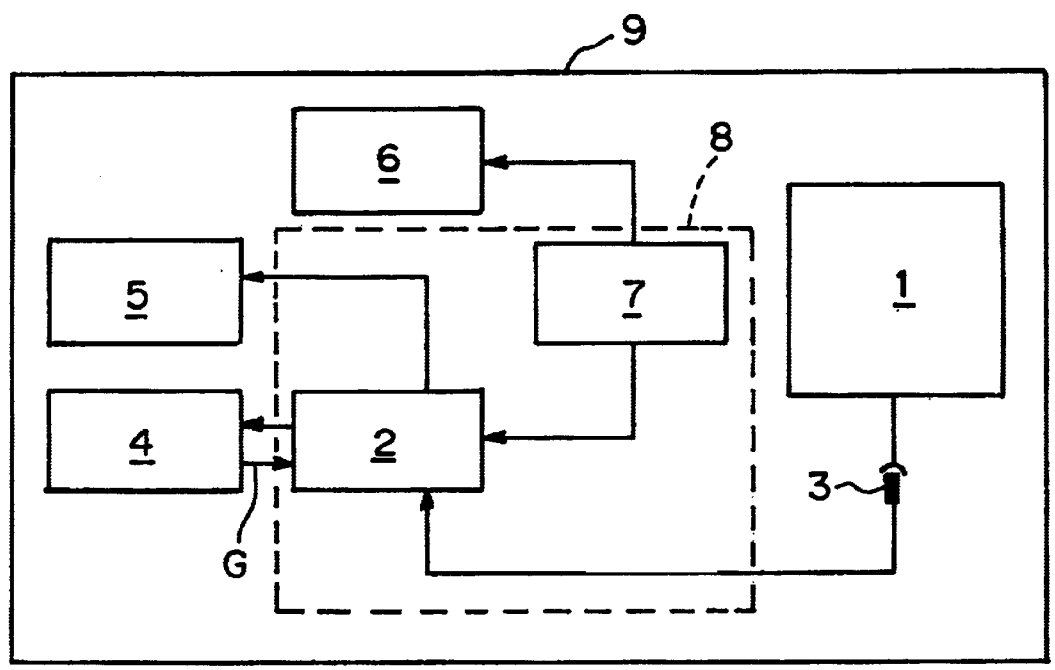

VEHICLE WITH AN ELECTRICAL TRACTION MOTOR AND AN ADDITIONAL USER OF ELECTRICAL ENERGY AND METHOD FOR OPERATION OF THE VEHICLE

BACKGROUND OF THE INVENTION

1. Field of the Invention

This invention relates to a vehicle that has at least one electrical traction motor, at least one additional user of electrical energy, a traction control system and a source of electrical energy. It further relates to a method for the operation of a vehicle that has an electric motor traction drive, whereby by means of a vehicle control system, during traction operation, electrical energy from an energy source is fed into at least one electrical traction motor and into at least one additional user of electrical energy.

2. Description of the Prior Art

If the electrical energy source fails in a vehicle that has an electric motor traction drive, neither the traction motor nor the electrical users are any longer supplied with electrical energy. If the user in question is a safety-relevant component or system, such as the electric motor of an electro-hydraulic steering system, for example, it is necessary to take measures to respond to this contingency and to ensure that the vehicle can still be steered until it comes to a stop.

In practice, this is achieved by taking energy from a second energy supply system that has its own energy storage mechanism and feeding said energy to the user. For an electro-hydraulic steering system, for example, an emergency hydraulic power supply can be provided by means of a hydraulic reservoir, by means of which the vehicle can still be steered for a certain length of time, although the steering force that must be applied is greater. In Diesel-electric vehicles, moreover, it is possible in the event of the failure of the Diesel engine and/or of the electrical generator that is driven by it, to take electrical energy from the starter battery.

Finally, as a result of a redundant design of the energy supply system, the energy supply can be guaranteed even in emergencies, although providing such a capability is complex and expensive.

The object of this invention is to make available a vehicle and a method of the type described above, by means of which the safety-relevant electrical users can be supplied with electrical energy even in the event of a failure of the energy source.

SUMMARY OF THE INVENTION

The invention teaches that this object can be accomplished on a vehicle of the type described above if the traction motor is effectively connected with the vehicle control system so that in the event of a failure of the electrical energy source, the vehicle is automatically braked regeneratively and the user is supplied with electrical energy by the traction motor which is operating in the regenerative mode.

The method taught by the invention accomplishes this object because, in the event of a failure of the electrical energy source during traction operation, the vehicle is automatically braked regeneratively, whereby electrical energy is fed to the user by the traction motor operating in the regenerative mode.

The teaching of the invention is accordingly to convert the kinetic energy of the moving vehicle into electrical energy, and thus to continue supplying the users with power until the vehicle comes to a stop.

It is, therefore, possible to securely bring a vehicle that operates on battery electric power, for example, to a stop when its traction battery fails (e.g., the battery contacts open accidentally). The invention makes it possible to do without a second energy supply.

The vehicle is advantageously braked regeneratively by the vehicle control system so that the electrical energy generated by the traction motor is sufficient to operate all the safety-relevant users.

In one advantageous configuration of the invention, the electrical energy that is generated by the traction motor operating in the regenerative mode is fed into a user that is realized in the form of an electrically actuated brake (brake by wire).

As an alternative or in addition, it is possible to feed the electrical energy generated by the traction motor functioning in the regenerative mode into a user that is realized in the form of an electrical steering system.

The realization of the vehicle in the form of an industrial truck, in particular an electric fork lift truck, that has a traction battery is particularly favorable. The same is true for the use of the method taught by the invention in an industrial truck, in particular an electric fork lift truck, that has a traction battery.

Additional advantages and details of the invention are explained in greater detail on the basis of an exemplary embodiment that is illustrated schematically in the accompanying drawing.

BRIEF DESCRIPTION OF THE DRAWING

The FIGURE shows the individual components of a vehicle that is operated according to the method taught by the invention and the flow of energy between the individual components.

DETAILED DESCRIPTION OF THE INVENTION

A traction battery 1 of a fork lift truck 9 that is operated by an electric battery supplies electrical energy to a power module 2 of a traction control system 8. The flow of energy can be interrupted by a battery contact 3. The power module 2 feeds electrical energy into an electrical traction motor 4 of a traction drive and to an additional electrical user 5, such as an electric steering system, for example.

The power module 2 and thus the individual users are actuated by means of an electronic vehicle control system 6 which is supplied with energy by the power module 2, with the interposition of a voltage transformer 7.

In the event of the failure of the traction battery, for example as the result of the unintentional opening of the power module 2, the vehicle control system 6 automatically initiates a braking process. In this case, the traction motor 4 operates in the regenerative mode.

The electrical energy (energy flow arrow G) generated by the traction motor 4 is fed via the power module 2 into the vehicle control system 6, the voltage transformer 7 and into the electric steering system (user 5), as well as into other safety-relevant users, if necessary. The fork lift truck can, therefore, continue to be steered until it comes to a stop.

In addition to the electrical steering system, other safety-relevant users—and even non-safety-relevant users—of electrical energy can be connected to the power module 2 or to the voltage transformer 7, such as an electric brake, for example.

Having described the invention, it is to be understood that it may otherwise be embodied within the scope of the appended claims.

I claim:

1. A vehicle, comprising:

at least one electrical traction motor;

at least one additional user of electrical energy;

a vehicle control system; and a source of electrical energy, the at least one traction motor being effectively connected with the vehicle control system so that in the event of a failure of the source of electrical energy, the vehicle is automatically decelerated in regenerative operation and the at least one additional user is supplied with electrical energy by the at least one traction motor which is operating in a regenerative mode, wherein the at least one additional user is selected from an electric steering system and an electric brake, and wherein the vehicle control system decelerates the vehicle by causing the at least one traction motor to operate in the regenerative mode so that the electrical energy generated by the at least one traction motor is at least sufficient to operate the at least one additional user.

2. The vehicle claimed in claim 1, wherein the vehicle is an industrial truck and the source of electrical energy is a traction battery.

3. The vehicle claimed in claim 2, wherein the industrial truck is an electric fork lift truck.

4. The vehicle claimed in claim 1, wherein the vehicle is an industrial truck and the source of electrical energy is a traction battery.

5. A method of operating a vehicle, whereby during traction operation, electrical energy is fed by means of a vehicle control system from an electrical energy source into at least one electric traction motor and into at least one additional user, and in the event of the failure of the source of electrical energy during traction operation electrical energy is generated by automatically decelerating the vehicle using the at least one traction motor in regenerative operation, and supplying the at least one additional user with the generated electrical energy, the method comprising:

generating electrical energy by the at least one traction motor operating in the regenerative mode and feeding the electrical energy into at least one of an electrically actuated brake and an electrical steering system, wherein the vehicle control system decelerates the vehicle by causing the at least one traction motor to operate in the regenerative mode so that the electrical energy generated by the at least one traction motor is at least sufficient to operate the at least one additional user.

6. The method claimed in claim 5, wherein the vehicle is an industrial truck with a traction battery.

7. The method claimed in claim 6, wherein the industrial truck is an electric fork lift truck.

* * * * *